US007768996B1

(12) United States Patent
Fourie et al.

(10) Patent No.: US 7,768,996 B1
(45) Date of Patent: Aug. 3, 2010

(54) ROUTE RE-QUERY SCHEME IN COMMUNICATION NETWORKS

(75) Inventors: Henry Louis Fourie, Los Gatos, CA (US); Paul Edwin Jones, Apex, NC (US); Cheng Kun Wang, Singapore (SG); Madhu Gindi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2210 days.

(21) Appl. No.: 10/393,658

(22) Filed: Mar. 20, 2003

Related U.S. Application Data

(60) Provisional application No. 60/439,210, filed on Jan. 9, 2003.

(51) Int. Cl.
*H04L 12/66* (2006.01)
*H04M 7/00* (2006.01)
(52) U.S. Cl. .............. 370/352; 379/221.01; 379/221.03
(58) Field of Classification Search ................. 370/352, 370/356, 218, 351, 236, 410; 709/237, 241, 709/229; 714/13; 379/221.01, 221.03; 455/510
See application file for complete search history.

(56) References Cited

U.S. PATENT DOCUMENTS

| | | | | |
|---|---|---|---|---|
| 6,591,301 B1 * | 7/2003 | Li et al. | ....................... | 709/229 |
| 6,603,849 B2 * | 8/2003 | Lin et al. | ................ | 379/221.01 |
| 6,925,076 B1 * | 8/2005 | Dalgic et al. | ................. | 370/356 |
| 6,973,027 B1 * | 12/2005 | Shaffer et al. | ................ | 370/218 |
| 7,054,327 B2 * | 5/2006 | Hagirahim et al. | ........... | 370/410 |
| 2001/0032270 A1 * | 10/2001 | Koo | ............................ | 709/237 |
| 2002/0082032 A1 * | 6/2002 | Hunzinger | ................... | 455/510 |
| 2002/0136206 A1 * | 9/2002 | Gallant et al. | ................ | 370/352 |
| 2002/0181401 A1 * | 12/2002 | Hagirahim et al. | ........... | 370/236 |
| 2003/0101372 A1 * | 5/2003 | Bouat et al. | .................... | 714/13 |
| 2004/0044790 A1 * | 3/2004 | Loach et al. | ................. | 709/241 |
| 2006/0146784 A1 * | 7/2006 | Karpov et al. | ................ | 370/351 |

OTHER PUBLICATIONS

ITU T (Telecommunication Standardization Sector of ITU) H.323 (Nov. 2000) Series H: Audiovisual and Multimedia Systems, Infrastructure of audiovisual services—Systems and terminal equipment for audiovisual services, "Packet-based multimedia communications systems" (242 pages).
ITU-T (Telecommunication Standardization Sector of ITU) Draft H.460.8 (Oct. 2002) Series H: Audiovisual and Multimedia Systems, Infrastructure of audiovisual services—Systems and terminal equipment for audiovisual services, "Querying for Alternate Routes within H.323 Systems" (10 pages).

* cited by examiner

*Primary Examiner*—Thjuan K Addy
(74) *Attorney, Agent, or Firm*—Marger Johnson & McCollom, P.C.

(57) ABSTRACT

A method for re-querying for routing information is disclosed. The method transmits an initial admission query to a gatekeeper or a request for routing information and receives an admission confirmation or routing information response with a destination address. The method then tries to establish a connection with the destination address. Upon reception of a call failure message including a failure cause, the method, optionally, increments a counter and transmits a re-query to the gatekeeper or other routing entity, and the re-query includes the failure cause and, optionally, a value of the query counter.

16 Claims, 4 Drawing Sheets

ROUTE RE-QUERY SCHEME IN COMMUNICATION NETWORKS

RELATED APPLICATIONS

This application is a continuation of U.S. Provisional Application No. 60/439,210 filed Jan. 9, 2003, and claims priority thereto.

BACKGROUND

1. Field

This disclosure relates to routing queries in packet-based networks, more particularly to a method for allowing a route re-query in H.323 and SIP (Session Initiation Protocol) networks.

2. Background

In H.323 networks, entities referred to as endpoints query a gatekeeper for admission to the network for a call. These endpoints, such as endpoints, typically use Registration, Admission and Status (RAS) admission requests, typically abbreviated as ARQ. The gatekeeper responds with admission confirm (ACF) messages that contain the routing information necessary for the originating endpoint to make call attempts to the destination.

When the gatekeeper receives the admission request, it may access another device or function, such as a routing server, that contains the routing information on possible routes between the originating endpoint and the destination endpoint. The ACF message transmits this routing information to the originating endpoint. For example, the ACF message may contain the Internet Protocol (IP) address for the destination endpoint.

The originating endpoint receives the ACF message and attempts to make a call to the destination endpoint specified in the message. However, in most current implementations of this type of exchange, if the call attempt to the destination fails, the call is released by the originating endpoint and the call fails.

In some instances, the gatekeeper may provide alternate destination endpoints in the ACF message. The endpoint should attempt to establish calls with these alternate endpoints if the initial attempt should fail. However, some limitations of the alternate endpoints exist. For example, different destinations may require different source or destination information to appear in the setup message transmitted to establish the call. As this information cannot be carried in the ACF message, the originating endpoint cannot use it, which will cause the call to fail. This results in alternate endpoints that are not feasible endpoints for the call.

Another limitation may reside in security information needed for each alternate endpoint. In order to utilize these endpoints, the originating endpoint would be required to generate the security information for each endpoint provided. As calls are normally completed to the initial destination, the overhead costs of generating this information may be considered too expensive when compared with the probability of actually employing it.

In other networks, such as SIP networks and even H.323 networks that utilize the Gatekeeper routed call signaling model, routing information may be determined by intermediate signaling entities, such as SIP proxies or routing Gatekeepers, by communicating directly with the routing function without involving the endpoint in subsequent route re-queries and subsequent call setup attempts. The use of RAS from an H.323 endpoint to a Gatekeeper that communications with a routing function is one just one topology that is part of this invention.

SUMMARY

A method for re-querying for routing information is disclosed. The method transmits an initial admission query to a gatekeeper and receives an admission confirmation with a destination address. The method then tries to establish a connection with the destination address. Upon reception of a call failure message including a failure cause, the method increments a counter and transmits a re-query to the gatekeeper, and the re-query includes the failure cause and a value of the re-query counter.

Another embodiment of the invention comprises a method of providing routing information. The method includes receiving a request for routing information and determining if the request includes a re-query indicator. The method then determines new routing information, transmits the new routing information, and stores the new routing information as previous routing information.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
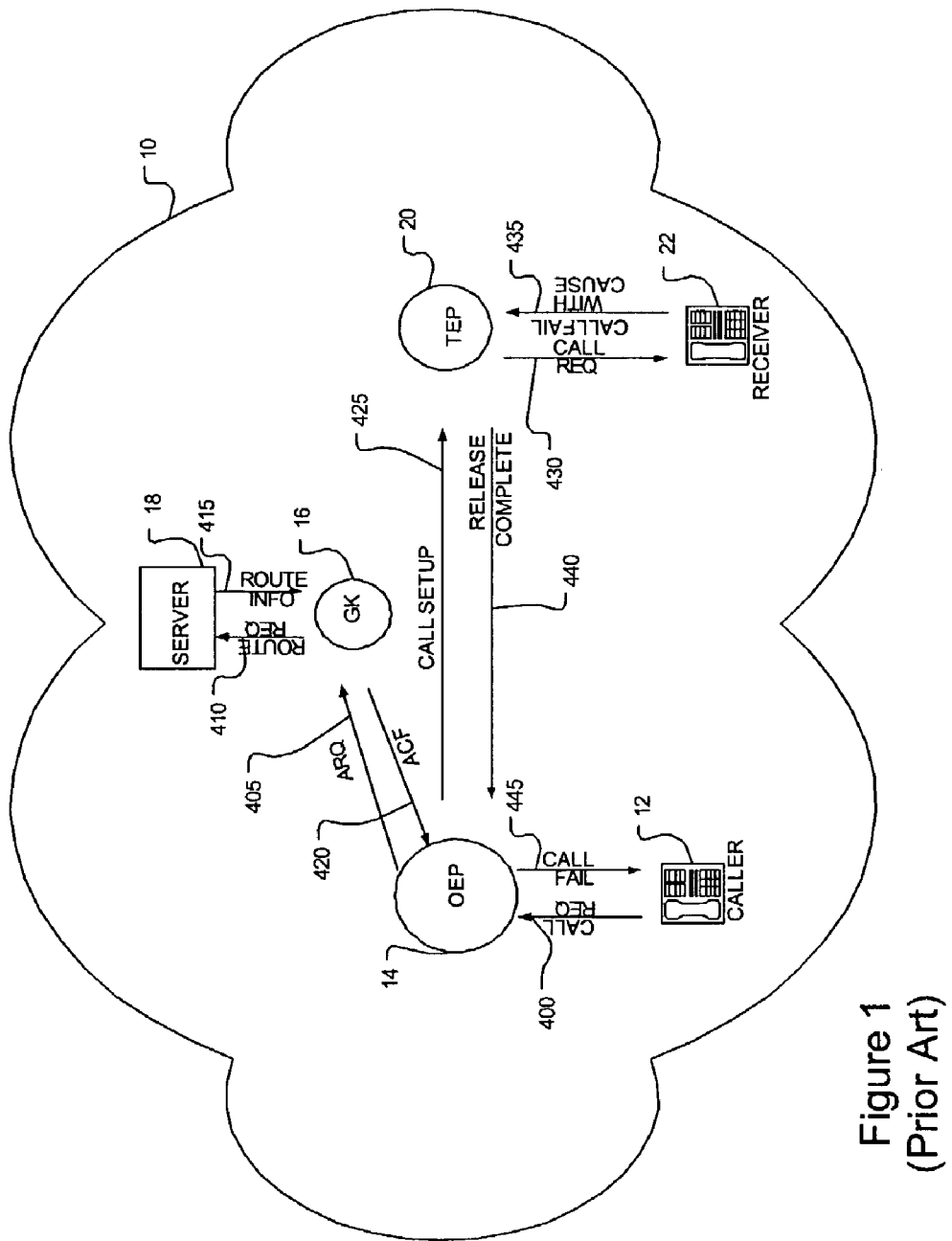
FIG. 1 shows an embodiment of a call flow according to the prior art.

FIG. 1 shows a communication system in accordance with the prior art. The components of the system include a calling station 12, which may be a telephone on the publicly switched telephone network (PSTN), a 'traditional' telephone.

A caller at 12 picks up the phone and dials the phone number for the destination endpoint, which is actually the number or other address of the receiving station 22. For purposes of this example, the network connecting the caller 12 to the receiver 22 is a network in compliance with the International Telecommunications Union (ITU) recommendation H.323 for multi-media communication networks. This originating endpoint 14 operating as a gateway 'converts' the PSTN phone call into a Voice over IP (VoIP) call on the H.323 network 30, and then the terminating endpoint 20 also operating as a gateway converts it back into a PSTN phone call. This type of transaction is typically transparent to the user at either end. Embodiments of this invention may be applicable to other types of communication networks; no limitation is intended on the scope of the claimed invention. However, for ease of discussion and better understanding of the invention, an H.323 network will be used as an example.

When the user places the call 400 from the PSTN phone 12, the call enters the H.323 network through an endpoint 14, which will be referred to as the originating endpoint (OEP). It may also be referred to as an H.323 endpoint, as it is one end of the call within the H.323 network. The endpoint then sends a message to a gatekeeper GK 16 to request admission and to determine the route to the destination endpoint. This is typically done under the Registration, Admission and Status (RAS) protocols. The gatekeeper 16 receives the admission request (ARQ) 405 and then sends a route request 410 to the back-end server 18. The back-end server may also be referred to as a route server and may be integrated into the gatekeeper or may be a separate entity residing on the network.

The route server then accesses routing tables or other information that provides the information needed to route the call from the originating endpoint to the destination endpoint. This is then provided to the gatekeeper 16 as routing information in response message 415. The gatekeeper 16 then provides the routing information to the originating endpoint 14 in the form of admission confirmation (ACF) message 420. The routing information may be sent in the form of an Internet Protocol (IP) address of the destination endpoint.

It must be noted that in some networks, the routing information may not actually be routing addresses and such. It may instead be indices into a routing information database. Information stored in the server may be a set of pointers to the actual information returned.

The originating endpoint 14 then sends a set up message 425 to establish the call to the terminating endpoint 20. In the H.323 realm of this particular example, that message would be an H.225.0 Setup message. H.225.0 is another ITU recommendation for call control signaling. Upon receipt of the call setup message, the terminating endpoint 20 then sends a setup message 430 to the PSTN switch to which the receiver 22 is connected. Typically, this will be a Setup message under ITU recommendation Q.931.

When a call fails, a Q.931 Release message 435 would be sent back from the PSTN switch to the terminating endpoint 20. The Release message will include a failure cause providing information as to why the call failed, referred to as a cause value (CV). The terminating endpoint 20 then sends an H.225.0 Release Complete message 440 to the originating endpoint 14. The H.225.0 message will include the cause value for why the call failed.

In the current art, this results in the call failing completely from the calling end. This reduces the overall call success rate for a particular network. This in turn may result in a degraded level of service to customers. In some cases, the ACF message 420 transmitted from the gatekeeper 16 to the originating endpoint 14 may include a list of alternate endpoints to be used by the originating endpoint to attempt to route the call to the destination. However, this list of alternate endpoints may not include sufficient information to allow a successful connection to those endpoints. Therefore, call attempts to those alternate endpoints may not be successful.

Additionally, the alternate endpoints may require unique security information that has to be generated prior to call setup being initiated. Many system designers may not provide the endpoints with this capability as it increases the complexity and costs of the system. As most calls are successful on their first attempts, this may be viewed as unnecessary and these endpoints become unusable.

Figure 2:
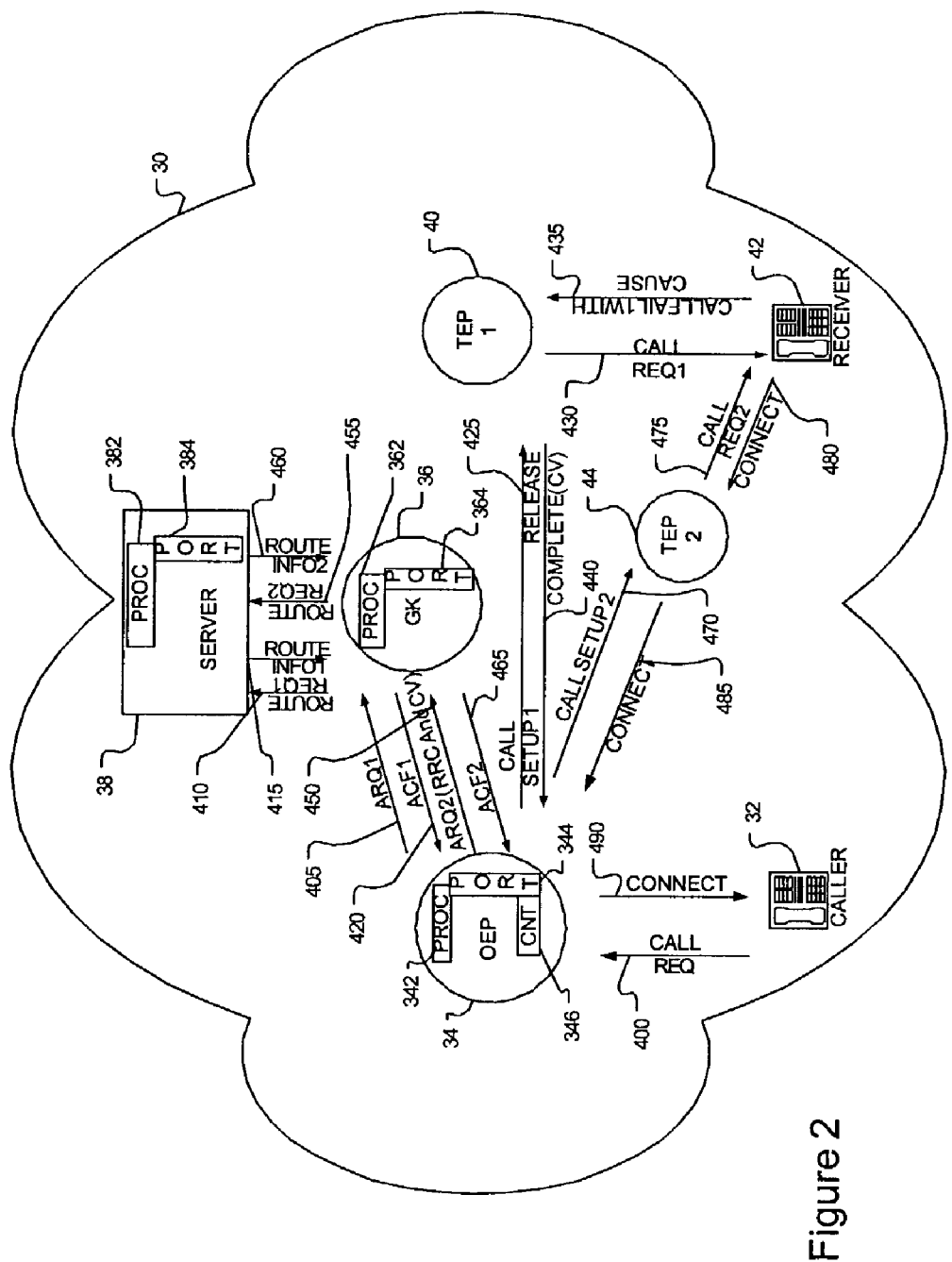
FIG. 2 shows an embodiment of a call flow in accordance with embodiments of the invention.

A communication system in accordance with embodiments of the present invention is shown in FIG. 2. The call flow from the originating endpoint 34 to the gatekeeper 36 proceeds as in the previous example, except that the first ARQ and first ACF are designated as ARQ1 405 and ACF1 420 for purposes of differentiating the two attempts in this discussion. Upon reception of the H.225.0 Release Complete message 440 from the terminating endpoint (TEP1) 40 to the originating endpoint 34, the originating endpoint does not send the call failure message to the caller 32. Instead, the originating endpoint will send a second ARQ message 450 (ARQ2 in this discussion), including the failure cause received from the terminating endpoint 40. Again, the failure cause is typically documented as a cause value in the H.225.0 Release Complete message. The ARQ2 will also include a re-query counter.

The re-query counter 346 may be set initially to zero, although other values are possible. When a re-query is initiated this counter is incremented and included in the subsequent ARQ 450 sent to the gatekeeper. This informs the gatekeeper that this is another attempt from the previous call. As will be discussed later, the counter value and a call identifier may be used to determine new routing information. The gatekeeper sends a second route request (Route Req2) 455 to the route server 38. The gatekeeper includes the re-query counter and the cause value in the second route request. The server 38 provides new routing information in its routing response (Route Info2) 460. As will also be discussed later, the counter is optional, as it may not be used in some network types.

For purposes of this discussion, the routing information now identifies the destination to be terminating endpoint 44 (TEP2). The gatekeeper 36 then sends this information back to the originating endpoint 34. The originating endpoint 34 then sends a second call setup message 470, this time to the second terminating endpoint 44. The terminating endpoint 44 then sends the Q.931 setup message 475 to the PSTN switch. The call is successfully routed to the called party and the call establishment process now continues.

For example, the call establishment process may next involve the PSTN switch sending a Q.931 Alerting message to the terminating endpoint 44, indicating that it is ringing the called party at 42. The terminating endpoint 44 then sends the H.225.0 Alerting message back to the originating endpoint 34. The originating endpoint sends an Alerting message to the PSTN switch to which the caller 32 is connected.

When the called party at the receiver 42 answers the call, the PSTN switch sends a Q.931 Connect 480 to the terminating endpoint 44. The H.225.0 Connect message 485 is then transmitted from the terminating endpoint 44 to the originating endpoint 34. The originating endpoint then transmits a Q.931 Connect 490 to the PSTN switch at the calling end. The voice path is now established in both directions and the call has been established successfully.

In the event of a second call failure the originating endpoint may repeat the re-query procedure subject to acceptable limits of post dial delay.

Figure 3:
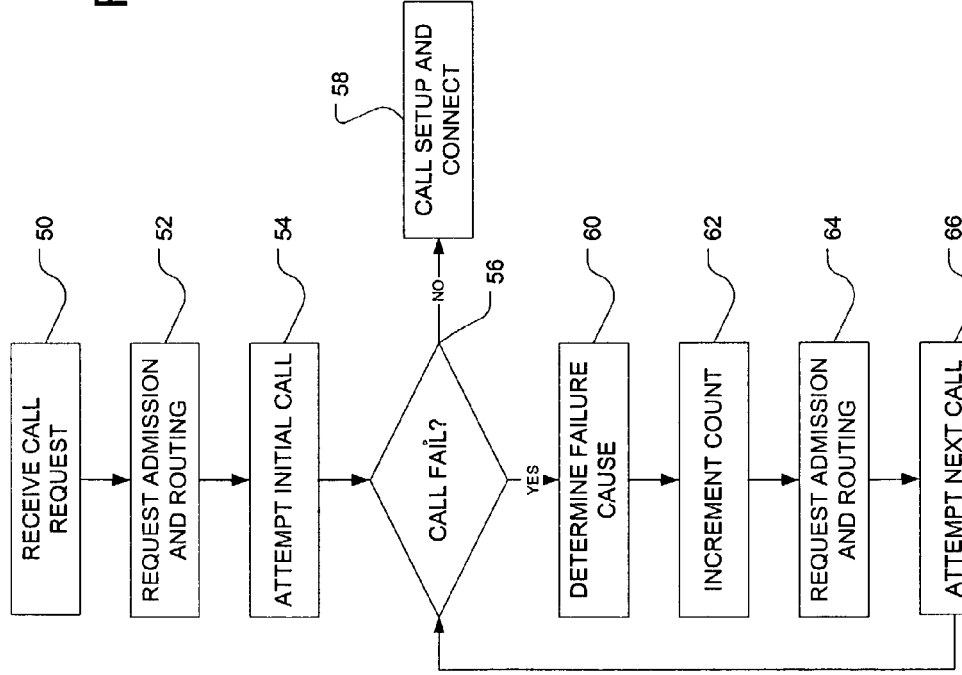
FIG. 3 shows a flow chart of an embodiment of a process of sending a re-query from an originating endpoint.

Having seen an overview of the re-query process, the discussion will now move to the implementation of embodiments of the invention at the endpoint, gatekeeper and route server that allow the re-querying process to succeed. FIG. 3 shows a method of re-querying for subsequent admissions to the network from an originating endpoint.

At 50, the call request is received from the PSTN switch. The endpoint then requests admissions and routing at 52. The initial call is attempted at 54. If the call is successful at 56, the call setup and connect process continues as usual at 58. However, if the call is unsuccessful at 56, the process moves to a re-querying process.

At 60, the failure cause, typically in the form of an H.225.0 Release Complete cause value, is determined and possibly stored. In an H.323 network, the re-query count is incremented at 62. A possible source of failure could arise from the terminating endpoint not being available, or failing. In that instance, the originating endpoint would need to produce the failure cause to be included in the new ARQ. The new ARQ message is sent, possibly including the cause value and the re-query count at 64.

If there is no re-query counter used, and therefore, no re-query count included in the second request, a different re-query indicator may be included. The re-query indicator may be explicitly identified as such, allowing the device performing the gatekeeper and/or route server functions to determine that it is a route re-query. Alternatively, the re-query indicator may not be an explicit indicator, but the request may be determined to be a re-query by the routing server after examining the request and making a local determination that it is a re-query.

For example, in a SIP network an INVITE message is sent to a SIP proxy. The SIP proxy then sends the INVITE to the destination or 'next hop' SIP proxy. If the attempt fails, the proxy will re-route the request on behalf of the endpoint. The proxy will either have the routing information, which, as mentioned above, may be pointers to information in a server.

It may be that the route server and/or gatekeeper determines by the information provided in the query that it is a re-query. For example, the re-query may include a destination that had been previously requested. To first inspection, this does not appear to be a re-query indicator, until the route server identifies the destination as being one for which a previous request was submitted. In summary, a re-query count, or any other index, could act as a re-query indicator.

When the new routing information is received, the call is re-attempted at 66. This may continue until the call is completed or, when a counter is used, the count reaches a value beyond which the system will not let the endpoint continue to attempt connection. Typically, this re-query count maximum is configurable and can be set to any value desired by the system designer. The value selected depends on acceptable limits to post dial delay—the time interval between the caller completing dialing and the first call progress signal received by the caller.

Figure 4:
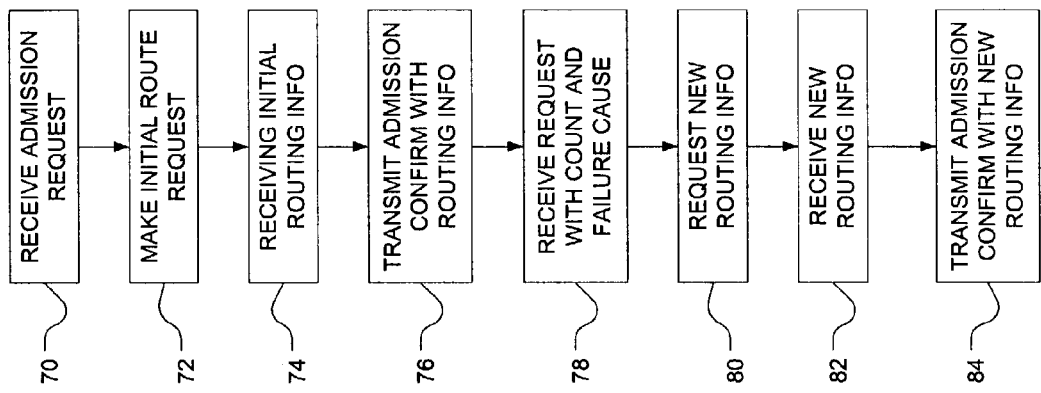
FIG. 4 shows a flow chart of an embodiment of a process of responding to a re-query.

FIG. 4 is a flowchart of a method for handling re-queries at gatekeeper. At 70, the initial admission request 405 is received. The initial route request 410 is made to the server at 72, with the initial routing information 415 being received back from the server at 74. The ACF confirm message 420 is sent to the originating endpoint at 76. At 78, another admission request 450 is received that has the same call identifier assigned to the first request, but also includes a cause value and a re-query count, indicating that this is a re-query for a previous call attempt. The gatekeeper then passes this information on to the server at 80, to allow the server to also determine that this is a re-query for a previous query. If, as mentioned above, the gatekeeper and server are actually the same device, this would involve an internal 'handoff' for processing. The new routing information 460 is received by the gatekeeper at 82 and is transmitted in another ACF message 465 at 84. In this manner, the gatekeeper and the server can determine that the second request is a re-query for a previous call attempt and then provide different routing information than was previously provided.

Figure 5:
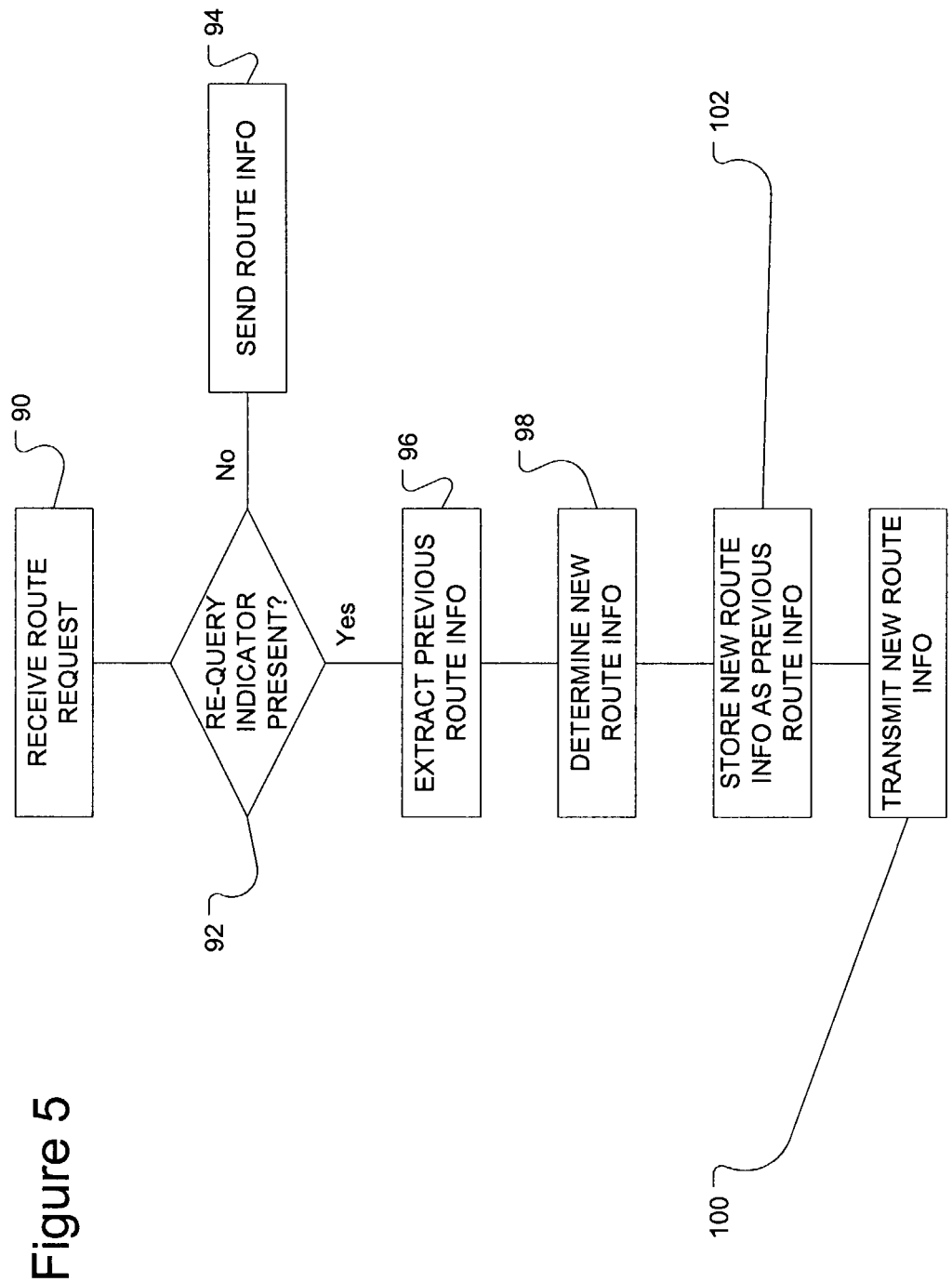
FIG. 5 shows a flow chart of an embodiment of a process of handling a request for routing information.

For non-H.323 networks, the route server would be the entity actually making the routing determination and interact directly with the originating endpoint to support the re-query procedures. FIG. 5 shows a flowchart of an embodiment of a method to provide routing information in response to a re-query. The route request is received at 90. For H.323 networks using a counter, if the re-query count is not present at 92, the routing information is sent as normal in 94. In one embodiment of the invention, this routing decision information is cached or otherwise stored for a short period of time. The period of time selected may depend upon the caller's expectation for post-dial delay. The call identifier may be used to correlate cached call routing information with subsequent route requests. A call identifier is some explicit value that uniquely identifies the call or some combination of values that may be used to identify a call.

However, if the re-query count or other re-query indicator is present, the previous routing information, associated with the call identifier provided with the admission request, is accessed. If, for example, the previous routing decision did not include the re-query count, the information about the routing decision would have been cached as above. The server would then access this information at 96.

The new routing information is determined at 98. The server handles subsequent route request using the cached routing information from a previous route request and any re-routing policies that have been configured. The server 38 of FIG. 2 returns a new route to the originating endpoint through the gatekeeper 36 of FIG. 2. For non-H.323 network embodiments, or for those not using a counter, the route server would have to resolve some information provided with the re-query request to allow the server to identify the request as a re-query. It may be that the destination is one for which a query is already submitted, or some other indication that it is a re-query.

In one embodiment of the invention, the routing information provided in response to the re-query request corresponds to the number of the re-query request. For example, when the re-query count is 2, the second route in the cache or routing database is returned. As mentioned above, the number of re-route attempts is configurable on the server, having some default value. It should be noted that the re-query count does not include alternative endpoint attempts.

The above three embodiments of admission re-querying and responses may be implemented in each of the devices as described above. Alternatively, or in conjunction with a hardware implementation, the methods and processes of the invention may be implemented in software. Such software implementation may be contained on an article of machine-readable media, such as an image file, diskette or disk.

Referring back to FIG. 2, it can be seen that one embodiment of the originating endpoint includes a communications port 344 that allows reception and transmittal of the necessary messages, and a processor 342 configured to perform the methods of the invention. If a re-query counter is used, it is shown at 346. Similarly, the gatekeeper may include a communications port 364 and a processor 362. The server 38 may include a communications port 384 and a processor 382.

Thus, although there has been described to this point a particular embodiment for a method and apparatus for route re-querying, it is not intended that such specific references be considered as limitations upon the scope of this invention except in-so-far as set forth in the following claims.

What is claimed is:

1. A network device, comprising:
  a port to transmit an initial admission request to a gatekeeper, to receive first routing information for a first call attempt from the gatekeeper, to transmit a set up message to a terminating endpoint associated with a receiving station, and to receive a failure message from the terminating endpoint; and
  a processor to:
    generate the initial admission request for a call from a calling station to the receiving station using an H.225.0 Setup message;
    determine that the first call attempt associated with the initial admission request has failed responsive to receiving the failure message as an H.225.0 Release Complete message with a cause value;
determine a failure cause for the first call attempt;
generate a second admission request for a second call attempt from the calling station to the receiving station including a re-query indicator, the re-query indicator including a re-query counter and the failure cause, wherein the port is further to transmit the second admission request to the gatekeeper and to receive second routing information from the gatekeeper.

2. The network device of claim 1 wherein the re-query counter is operable to track a re-query count.

3. The network device of claim 1, wherein the network device further comprises a H.323 endpoint.

4. A method of performing an admission re-query, the method comprising:
transmitting an initial admission request from an originating endpoint to a gatekeeper for a call from a calling station to a receiving station;
receiving at the originating endpoint a first admission confirmation including first routing information;
attempting to establish a connection from the calling station to the receiving station using the first routing information by transmitting an H.225.0 Setup message;
determining that a call failure has occurred by receiving at the originating endpoint an H.225.0 Release Complete message with a cause value from a terminating endpoint identified in the first routing information;
transmitting a re-query from the originating endpoint to the gatekeeper, wherein the re-query includes a re-query indicator, the re-query indicator including a re-query counter and a cause value for the call failure;
receiving a second admission confirmation including second routing information from the gatekeeper; and
attempting to establish the connection using the second routing information.

5. The method of claim 4, wherein the method further comprises incrementing the re-query counter after determining that the call failure has occurred.

6. The method of claim 5, wherein transmitting a re-query further comprises transmitting a value of the re-query counter.

7. The method of claim 4, wherein determining that a call failure has occurred further comprises determining that the terminating endpoint identified in the first routing information has failed.

8. The method of claim 4, wherein the method further comprises:
receiving a message from a terminating endpoint identified in the second routing information indicating that the call will be accepted; and
completing the call.

9. A network device, comprising:
a port to receive a request for routing information for a call from an originating endpoint in the form of an H.225.0 Setup message;
a processor to:
determine if the request includes a re-query indicator, the re-query indicator including a re-query counter and a failure cause;
if the request includes the re-query indicator:
extract previous routing information; and
provide the routing information to the originating endpoint based upon the re-query counter and the failure cause; and
a memory to store the routing information.

10. The network device of claim 9, wherein the network device further comprises a back-end server in communication with a gatekeeper.

11. The network device of claim 9, wherein the network device further comprises a gatekeeper having route server capabilities.

12. A method of providing routing information, the method comprising:
receiving a request for routing information for a call from an originating endpoint in the form of an H.225.0 Setup message;
determining if the request includes a re-query indicator, the re-query indicator including a re-query counter and a failure cause; and
if the request includes the re-query indicator:
extracting previous routing information based in part upon the re-query counter and the failure cause;
determining new routing information;
transmitting the new routing information to the originating endpoint; and
storing the new routing information as previous routing information.

13. The method of claim 12, the method further comprising identifying an initial query from the re-query counter.

14. The method of claim 12, wherein the method further comprises:
if the request does not include the re-query indicator:
determining the routing information;
transmitting the routing information to the originating endpoint; and
storing the routing information with a call identifier.

15. The method of claim 12, wherein extracting previous routing information further comprises accessing stored routing information by a call identifier associated with an initial route request and the re-query counter.

16. The method of claim 12, wherein determining the new routing information further comprises determining the new routing information based upon re-routing policies.

* * * * *